United States Patent
Liu et al.

(10) Patent No.: US 10,539,431 B2
(45) Date of Patent: Jan. 21, 2020

(54) RESOLVER AND ELECTRIC MOTOR USING SAME

(71) Applicant: Johnson Electric S.A., Murten (CH)

(72) Inventors: Xing Liu, Shenzhen (CN); Chengshun Du, Shenzhen (CN); Ning Sun, Shenzhen (CN); Ruifeng Qin, Hong Kong (CN); Yanbin Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 114 days.

(21) Appl. No.: 15/833,450

(22) Filed: Dec. 6, 2017

(65) Prior Publication Data

US 2018/0156638 A1    Jun. 7, 2018

(30) Foreign Application Priority Data

Dec. 6, 2016    (CN) .......................... 2016 1 1111745

(51) Int. Cl.
*H02K 11/00*    (2016.01)
*G01D 5/20*    (2006.01)
*H02K 11/225*    (2016.01)

(52) U.S. Cl.
CPC ......... *G01D 5/2046* (2013.01); *H02K 11/225* (2016.01)

(58) Field of Classification Search
CPC ..... G01D 5/2046; H02K 11/225; H02K 5/225
USPC .......................................................... 310/71
See application file for complete search history.

(56) References Cited

U.S. PATENT DOCUMENTS

| | | | | |
|---|---|---|---|---|
| 2007/0210658 A1* | 9/2007 | Terauchi | .................. | H02K 5/04 310/68 B |
| 2008/0169713 A1* | 7/2008 | Kataoka | ............... | G01D 5/2013 310/71 |
| 2009/0179529 A1* | 7/2009 | Makino | ................ | B62D 5/0403 310/68 B |
| 2015/0061652 A1* | 3/2015 | Otobe | ..................... | G01R 33/02 324/207.17 |
| 2015/0349593 A1* | 12/2015 | Jiang | .................... | H02K 1/2786 310/43 |
| 2015/0349594 A1* | 12/2015 | Zhang | ...................... | H02K 9/19 417/423.7 |
| 2018/0141583 A1* | 5/2018 | Wada | ....................... | H02K 5/02 |

* cited by examiner

*Primary Examiner* — Yuriy Semenenko
(74) *Attorney, Agent, or Firm* — Muncy, Geissler, Olds & Lowe, P.C.

(57) ABSTRACT

A resolver which includes a resolver rotor and a resolver stator. The resolver stator includes a resolver stator core, a winding bracket mounted on the resolver stator core, and a plurality of resolver windings wound on the winding bracket. The winding bracket includes an annular portion surrounding the resolver rotor, a connector extending outwardly from the annular portion, and a cover mounted on the connector. The connector includes a plurality of conductive terminals connecting both the resolver winding and lead wires, and a body receiving the conductive terminals. The cover abuts against the lead wires to secure the lead wires to connector.

17 Claims, 6 Drawing Sheets

RESOLVER AND ELECTRIC MOTOR USING SAME

CROSS REFERENCE TO RELATED APPLICATIONS

This non-provisional patent application claims priority under 35 U.S.C. § 119(a) from Patent Application No. 201611111745.0 filed in The People's Republic of China on Dec. 6, 2016.

FIELD OF THE INVENTION

The present invention relates to a resolver and an electric motor using the same.

BACKGROUND OF THE INVENTION

At present, a resolver is usually used to detect the position of the rotor of a brushless motor. The resolver includes a resolver stator with a plurality of teeth formed at inside thereof, and a resolver rotor disposed in the radial interior of the resolver stator. The resolver rotor is coaxial with the rotor of the motor and rotates synchronously with the rotor of the motor.

The exciting winding and the output winding are wound on the teeth of the resolver stator. When the resolver rotor rotates, the width of the gap formed between the rotor and the tooth of the resolver stator changes, resulting in a change of the induced potential produced on the output winding. Thus, the rotation position of the rotor of the brushless motor can be detected by detecting the change of the induced potential.

At present, winding brackets are generally mounted on the resolver stator. However, the current winding brackets are usually only used to insulate the windings of the resolver stator and the teeth of the resolver stator, and have only one single function.

SUMMARY OF THE INVENTION

Thus, there is a desire for a resolver which has a multiple function.

In one aspect, the present invention provides a resolver which comprises a resolver rotor and a resolver stator. The resolver stator comprises a resolver stator core, a winding bracket mounted on the resolver stator core, and a plurality of resolver windings wound on the winding bracket. The winding bracket comprises an annular portion surrounding the resolver rotor, a connector extending outwardly from the annular portion, and a cover mounted on the connector. The connector comprises a plurality of conductive terminals connecting both the resolver winding and lead wires, and a body receiving the conductive terminals. The cover abuts against the lead wires to secure the lead wires to connector.

Preferably, the cover comprises a base plate and a pressing member projecting from a surface of the base plate facing the connector.

Preferably, the cover comprises a base plate and a pressing member projecting from a surface of the base plate facing the connector, the pressing member abut against the lead wires.

Preferably, the cover comprises a base plate and a pressing member projecting from a surface of the base plate facing the connector, the pressing member abut against the lead wires.

Preferably, the cover comprises a base plate and a plurality of hooks projecting from the base plate and engaging with the connector to secure the cover to the connector.

Preferably, each conductive terminal comprises a first connecting portion coupled to one of the resolver windings, and a second connecting portion coupled to one of the lead wires, the first connecting portion and the second connecting portion are rigidly connected to each other.

Preferably, the body of the connector comprises a winding side portion formed at one end of the connector adjacent to the annular portion, the winding side portion defines a plurality of grooves with glue received therein, ends of wind wires, which forms the resolver windings, are attached to the winding side portion by the glue.

Preferably, the body of the connector comprises a plurality of guide slots respectively receiving and radially guiding the lead wires.

Preferably, the guide slots extend radially and outwardly, each guide slot having an opening formed at an end away from the annular portion.

Preferably, a width of each guide slot at the opening thereof is equal to or less than a diameter of one of the lead wires.

Preferably, a height of each guide slot at the opening thereof is equal to or less than a diameter of the lead wire, the cover presses against the lead wires onto the body of the connector at the openings to position the lead wires in the guide slots.

Preferably, the annular portion is mounted to an axially end of the resolver stator core, the annular portion defines a plurality of recesses depressed inwardly from the peripheral surface thereof Preferably, the resolver stator core comprises an annular yoke, the annular portion of the winding bracket comprises a limiting portion, the recesses are defined in the limiting portion, the limiting portion covers an axially end of the annular yoke with a radial width of the limiting portion being less than that of the annular yoke.

Preferably, the resolver stator core further comprises a plurality of resolver teeth, the annular portion of the winding bracket further comprising a plurality of tooth caps extending inwardly from the limiting portion for covering axial ends of corresponding resolver teeth, each recess is arranged between adjacent two tooth caps.

The present invention further provides an electric motor employing a resolver described above.

In the pressent disclosure, the cover abuts against the lead wires to thereby reduce the risk of damaging the connections between the lead wires and the resolver. The annular portion of the winding bracket is formed with recesses which reduce the strength of the winding bracket at the recesses and thus facilitate to assemble the winding bracket to the resolver stator core.

DETAILED DESCRIPTION OF THE PREFERRED EMBODIMENTS

Figure 1:
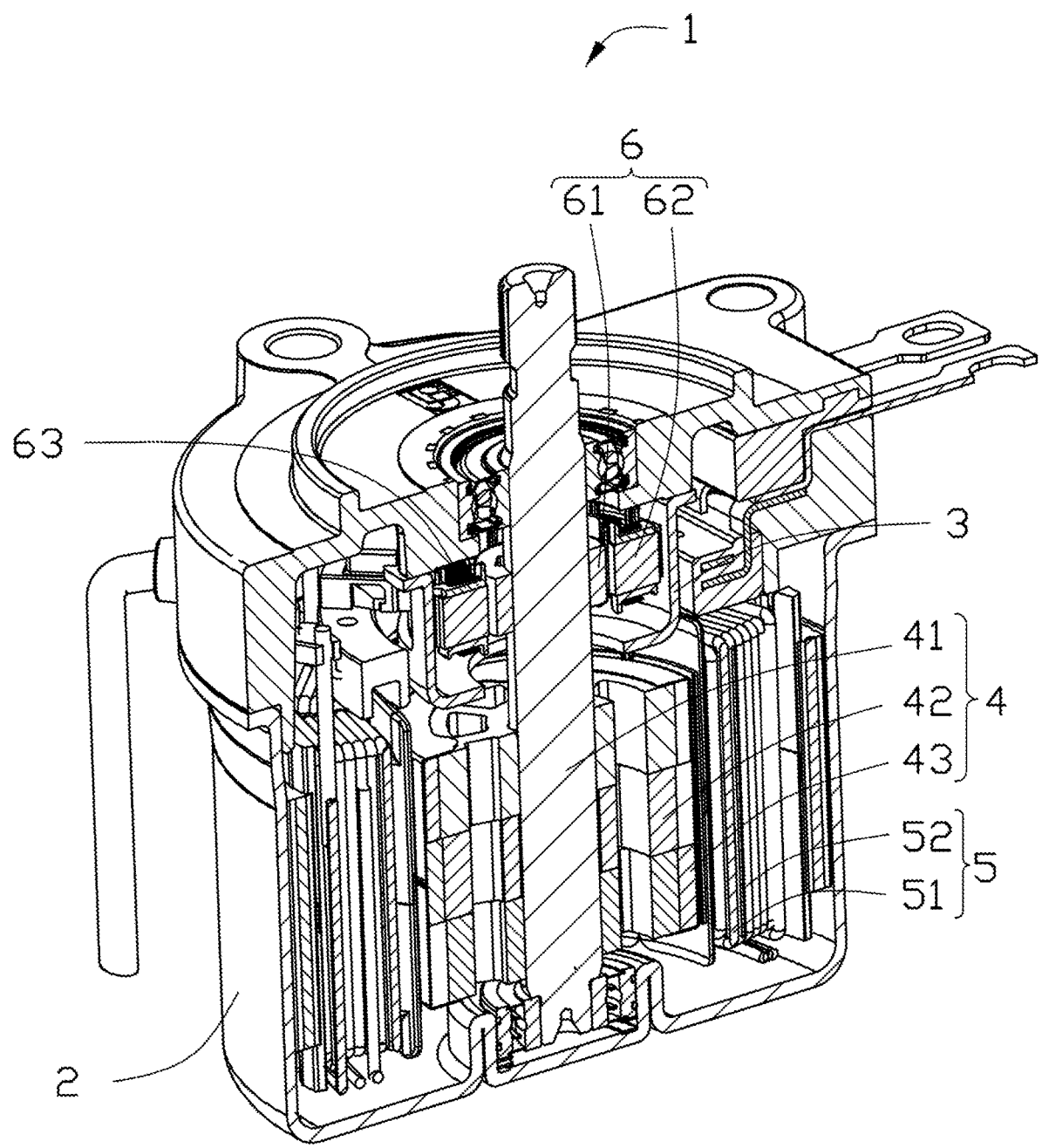
FIG. 1 is a sectional view of an electric motor according to one embodiment of the present invention.

Below, embodiments of the present invention will be described in greater detail with reference to the drawings. It should be noted that the figures are illustrative rather than limiting. The figures are not drawn to scale, do not illustrate every aspect of the described embodiments, and do not limit the scope of the present disclosure.

In order to simplify description, the spatial terms such as "inside", "outside", "inward" and "outward" here can be used to describe a relationship between a component or feature and other element/elements or feature/features as shown in figures. The spatial terms such as "upper surface", "lower surface", "upper portion", "top portion", "bottom portion", "inner surface" and "outer surface" here can be used to describe a relationship between a part of a component with respect to the other parts of the component as shown in figures. The device may be oriented in different directions (rotating 90 degrees or in other directions) and the description about the spatial relative relationship used here should be interpreted accordingly.

It should be understand that in the description of the present disclosure, the terms such as "width" and "height" indicate the orientation or position as shown in the drawings, only to facilitate the description of the disclosure and simplify the description, rather than indicate or suggest that the devices or components must have the specific orientation, construction and operation in the specific orientation, and therefore can not be understood as limiting the invention.

FIG. 1 is a sectional view of an electric motor 1 of an embodiment of the present invention. The motor 1 includes a housing 2, a supporting member 3, a rotor 4, a stator 5, and a resolver 6. The top of the housing 2 is formed with an opening where the supporting member 3 is mounted. Specifically, the housing 2 includes a base and an end cap. The rotor 4 and the stator 5 are accommodated in the base. The end cap is fixedly connected with the base. The supporting member 3 is fixed to the housing 2 by the end cap. The supporting member 3 is used to support the resolver 6. Preferably, the supporting member 3 is made of magnetic conductive material, which can shield electromagnetic interference (EMI) emitted from the stator 5 and the rotor 4. The rotor 4 is rotatably disposed within the housing 2. The rotor 4 includes a rotating shaft 41, a rotor core 42 and one or more rotor magnets 43. Preferably, the rotor core 42 is made of magnetic conductive material such as iron. The rotor core 42 is fixed on the rotating shaft 41. The one or more rotor magnets 43 are fixed to the rotor core 42. In the present embodiment, the rotor magnets 43 are fixed to an outer peripheral surface of the rotor core 42, and in other alternative embodiments, the rotor magnets 43 may also be fixedly inserted inside of the rotor core 42. The stator 5 is fixed within the housing 2 and surrounds the rotor 4. The stator 5 includes a stator core 51 made of magnetic conductive material and a plurality of coils 52 wound on the stator core 51. In operation, the coils 52 are electrified to generate a rotating magnetic field which interacts with the permanent magnets 43 of the rotor 4 to thereby drive the rotor 4 including the rotor magnets 43, rotor core 42 and rotating shaft 41 to rotate.

The resolver 6 includes a resolver rotor 61 and a resolver stator 62. The resolver rotor 61 is fixedly connected with the rotating shaft 41 of the motor 1, and rotatable synchronously with the rotor magnets 43. The resolver stator 62 faces radially the resolver rotor 61.

Figure 2:
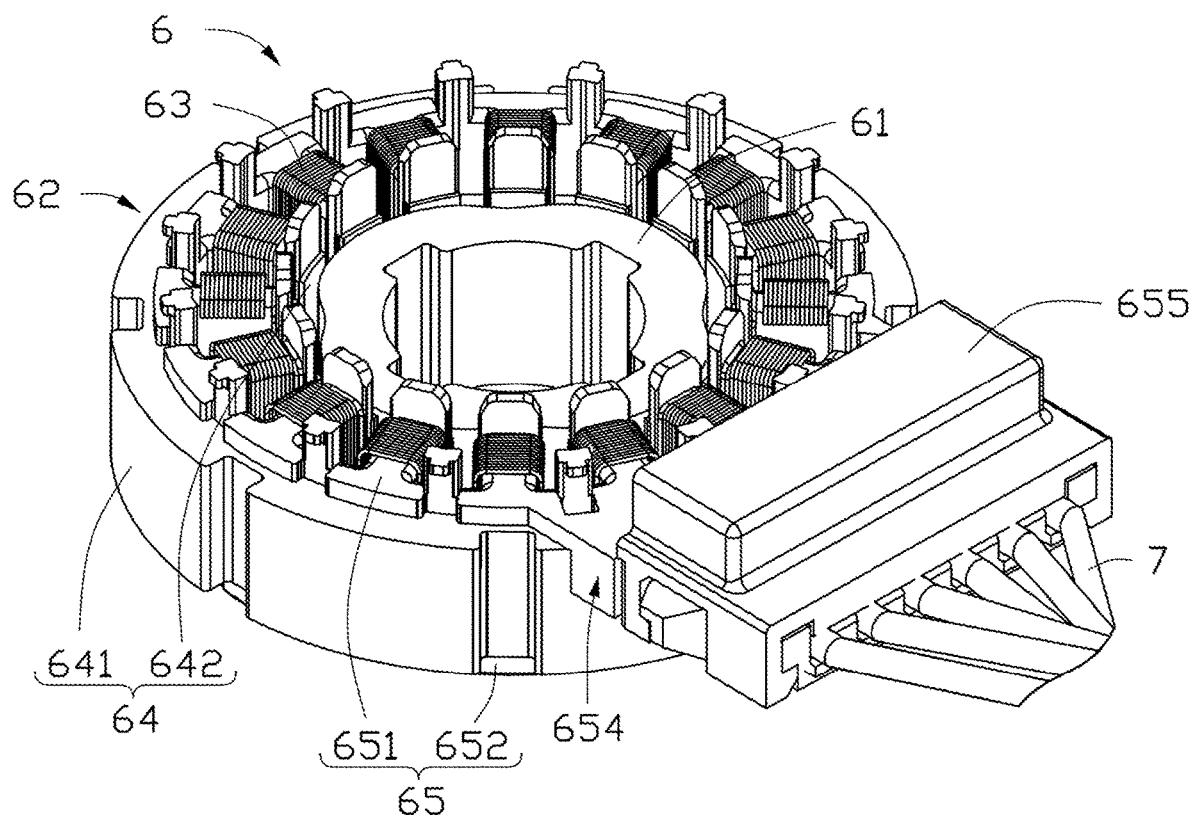
FIG. 2 illustrates a resolver of the motor of FIG. 1 connected with leads.
Figure 3:
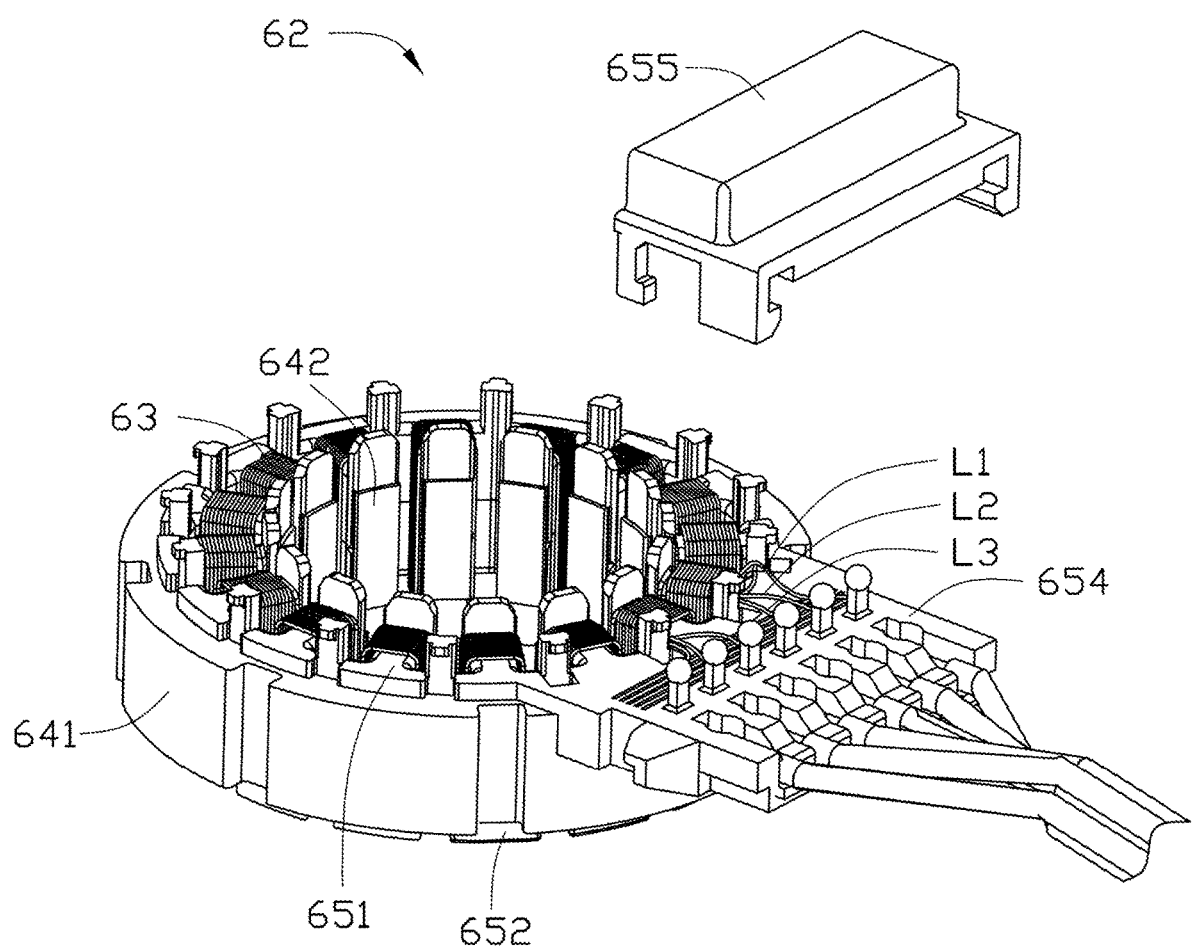
FIG. 3 is a partly exploded view of FIG. 2 with a resolver rotor removed.

FIG. 2 and FIG. 3 illustrate a resolver 6 of an embodiment of the present invention. The resolver stator 62 includes a resolver stator core 64, an winding bracket couple 65 fixed on the stator core 64, and a plurality of resolver windings 63 wound on the winding bracket couple 65.

The resolver stator core 64 includes an annular yoke 641 and a plurality of resolver teeth 642 extending inwardly from the annular yoke 641. In the present embodiment, the number of the resolver teeth 642 is sixteen. In other alternative embodiments, the number of the resolver teeth 642 is not limited to sixteen, for example, may be twelve or twenty and so on. The resolver windings 63 are formed by winding wires around the resolver teeth 642 via the winding bracket assembly 65. In this embodiment, the resolver windings 63 include an excitation winding, a first output winding and a second output winding, which are respectively formed by a wire L1, a wire L2 and a wire L3.

The resolver rotor 61 is located in a space surrounded by the resolver teeth 642 which are distributed along a circumferential direction of the resolver rotor 61. The resolver rotor 61 is radially spaced from the resolver stator 62. The resolver rotor 61 is substantially round. Portions of the resolver rotor 61 protrude outwardly and radially toward the resolver stator 62 relative to other portions of the resolver rotor 61 to form salient poles. The salient poles are evenly spacingly distributed in the circumferential direction of the resolver rotor 61, so that convex portions and concave portions are alternately formed on the outer peripheral surface of the resolver rotor 61 along the circumferential direction. Thus, the gap formed between the outer peripheral surface of the resolver rotor 61 and the stator 62 has an uneven width. In this embodiment, the number of salient poles is four, each pair of adjacent concave portion and salient pole formed by a convex portion is referred to as a pair of poles; in this embodiment, the resolver rotor 61 includes four pairs of poles. In alternative embodiments, the number of the salient poles may be two or six. The resolver rotor 61 is fixedly sleeved on the rotating shaft 41 of the motor rotor 4 so as to rotate with the rotating shaft 41 synchronously.

When the resolver rotor 61 rotates, the width of the gap between the outer surface of the resolver rotor 61 and the inner surface of the resolver teeth 642 changes, resulting in change of the induced potential of the resolver windings 63. Thus, the rotation position of the rotor magnet 43 of the motor 1 can be detected by detecting the changes of the induced potential of the resolver windings 63.

The structure of the winding bracket couple 65 is described in detail as below.

The winding bracket couple 65 is made of insulating material, such as resin material. The winding bracket couple 65 includes a first winding bracket 651 and a second winding bracket 652. The first winding bracket 651 and the second winding bracket 652 cooperatively clamp the resolver stator core 64 in an axial direction. In the present embodiment, the first winding bracket 651 is mounted on the axial upper portion of the resolver stator core 64, and the second winding bracket 652 is mounted on the axial lower portion of the resolver stator core 64. The resolver windings 63 are wound on the first winding bracket 651 and the second winding bracket 652, so that the first and second winding brackets 651 and 652 can separate the resolver windings 63 from the resolver stator core 64 to thereby insulate the resolver windings 63 from the resolver stator core 64.

Figure 4:
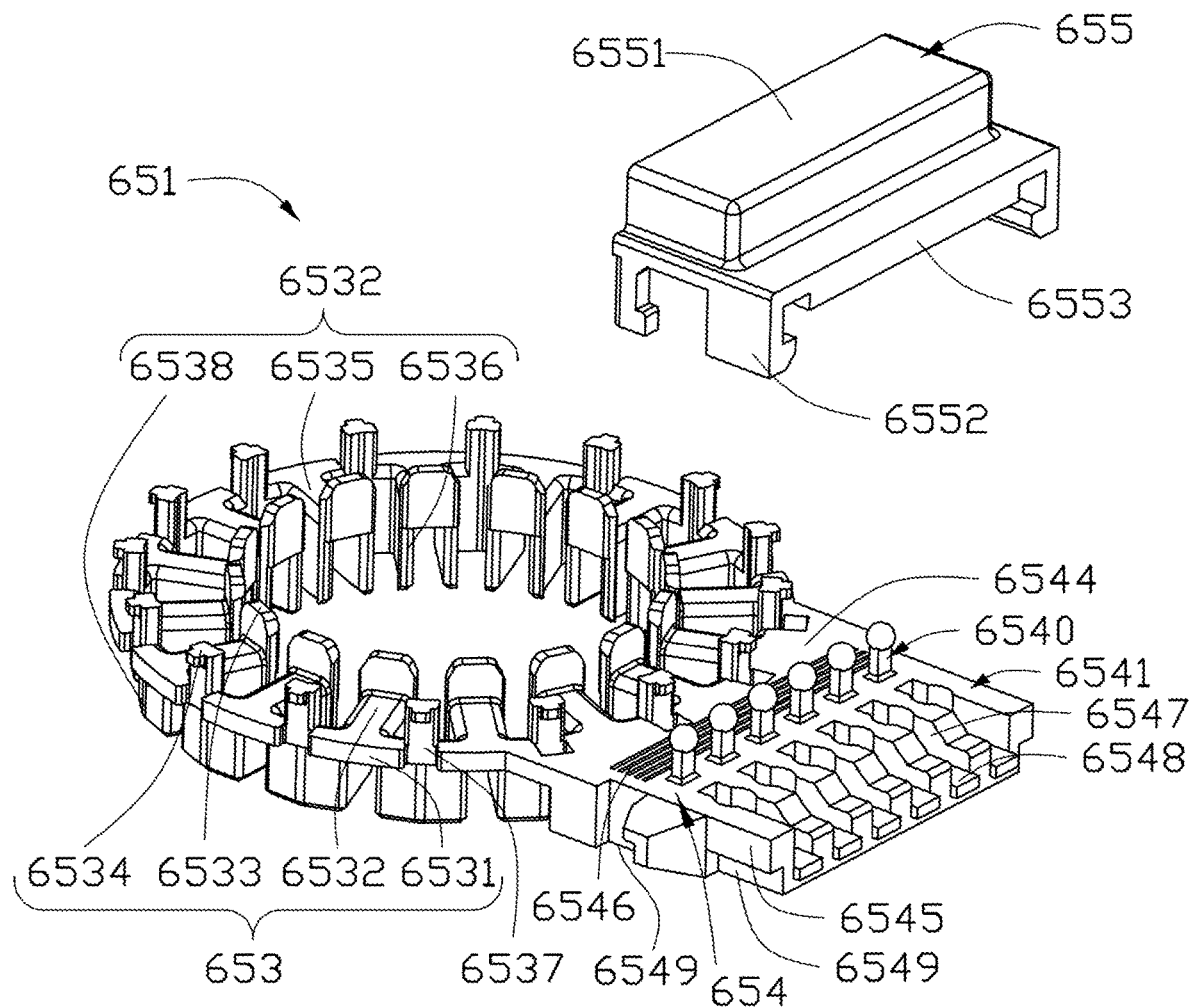
FIG. 4 is a perspective view of an upper winding bracket of the resolver of FIG. 2.

Referring also to FIG. 4, the first winding bracket 651 includes an annular portion 653 mounted on the axial upper portion of the resolver stator core 64, a connector extending radially and outwardly from the periphery of the annular portion 653, and a cover 655. The annular portion 653 includes a limiting portion 6531, a plurality of tooth caps 6532, a plurality of flanges 6533 and a plurality of wrapping posts 6534. In the present embodiment, the limiting portion 6531 is ring-shaped. The outer diameter of the limiting portion 6531 is larger than the inner diameter of the annular yoke 641. The limiting portion 6531 is configured to cover the resolver stator 62. The radial width of the limiting portion 6531 is smaller than the radial width of the annular yoke 641. In this embodiment, the limiting portion 6531 is formed with a plurality of recesses 6537 sunk inwardly from the outer peripheral surface thereof. In the present embodiment, each recess 6537 is formed between two adjacent tooth caps 6532. In this embodiment, the number of the recesses 6537 is the same as that of the resolver teeth 642. In alternative embodiments, the number of the recesses 6537 may be one-half, twice or other multiples of the number of the resolver tooth 642. In the present embodiment, the recesses 6537 are formed in the limiting portion 6531 with even space. The recesses 6537 decrease the strength of the first winding bracket 651 at the recesses 6537. Thus, when the first winding bracket 651 is assembled to the resolver stator core 64, the first winding bracket 651 is easy to deform which facilitates assembly (as shown in FIG. 2).

The tooth caps 6532 extend inwardly from the inner surface the limiting portion 6531. The tooth caps 6532 are spaced from each other. In this embodiment, the tooth caps 6532 are evenly spaced from each other along the circumferential direction. In the present embodiment, the number of the tooth caps 6532 is the same as the number of the resolver teeth 642. Specifically, each of the tooth caps 6532 comprises a top wall 6535 extending inwardly from the inner surface of the limiting portion 6531, a pair of side walls 6536 extending axially from opposite sides of the top wall 6535, and an end wall 6538 extending from an end of the top wall 6535 close to the limiting portion 6531. Each tooth cap 6532 is configured to cover a corresponding resolver tooth 642.

Each flange 6533 extends axially from an end of the corresponding tooth cap 6532 away from the limiting portion 6531 and protrudes out of the tooth cap 6532. The plurality of flanges 6533 are spaced from each other. In the present embodiment, the plurality of flanges 6533 are evenly spaced apart from each other. In this embodiment, the number of the flange 6533 is the same as the number of the resolver teeth 642. The flanges 6533 are configured to limit the position of coils of the resolver windings 63 wound on the tooth cap 6532 and prevent the coils of the resolver windings 63 from collapsing on the tooth cap 6532.

The wrapping posts 6534 protrude from the upper surface of the limiting portion 6531 in an axial direction. The plurality of wrapping posts 6534 are disposed on the limiting portion 6531 and spaced apart from each other. In the present embodiment, the wrapping post 6534 are evenly spaced from each other on the limiting portion 6531. The wrapping post 6534 are configured to guide the wires of the resolver windings 63 from one of the resolver teeth 642 to the other resolver tooth 642.

The connector 654 is configured to connect the resolver windings 63 with lead wires 7 which extend to the exterior of the resolver 6 and are connected to a control device. The connector 654 comprises a plurality of conductive terminals 6540 and a body 6541 receiving the conductive terminals 6540. In the present embodiment, the number of the conductive terminals 6540 is six. In alternative embodiments, the number of the conductive terminals 6540 is not limited to six, and may be eight or other quantities. The conductive terminals 6540 are made of electrically conductive material. In the present embodiment, the conductive terminals 6540 are made of copper. In other embodiments, the conductive terminals 6540 may be made of other conductive material, for example aluminum.

Figure 5:
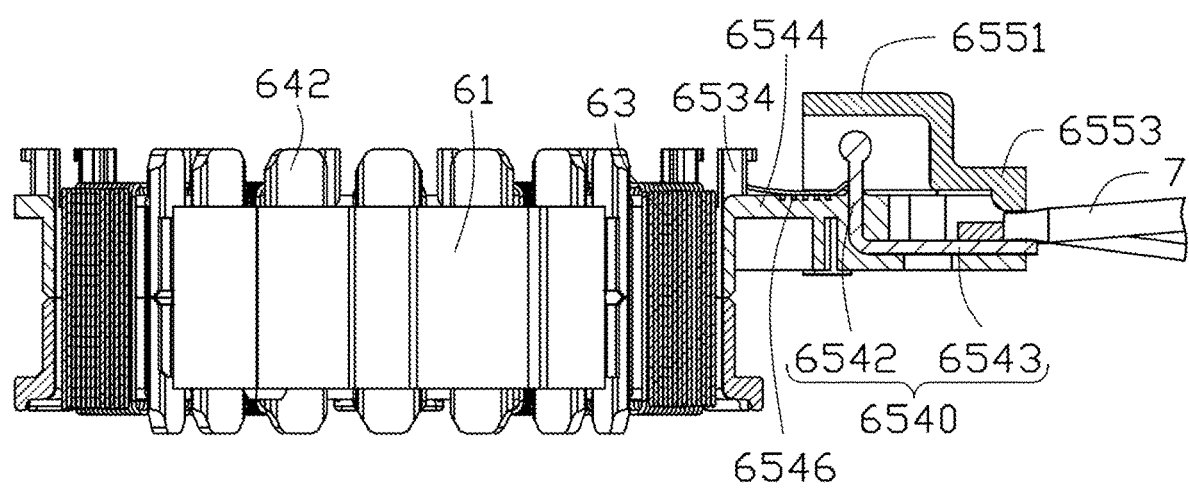
FIG. 5 is a cross section view of FIG. 1.

Referring to FIG. 5, in this embodiment, the conductive terminals 6540 are substantially L-shaped. Each conductive terminal 6540 includes a first connecting portion 6542, and a second connecting portion 6543 perpendicular to the first connecting portion 6542. The first connecting portion 6542 extends in an axial direction of the electric motor and protrudes out of the top of the body 6541. The ends of the wires L1, L2 and L3 are respectively secured to the first connecting portions 6542 of the conductive terminals 6540. Specifically, the first ends of the wires L1, L2, and L3 are respectively fixed to the first connecting portions 6542 of three of the six connecting portions 6542. The wires L1, L2 and L3 are wound on the corresponding resolver teeth 642, with the winding bracket couple 65 disposed between the wires L1, L2 and L3 and the resolver teeth 642. The second ends of the wires L1, L2 and the L3 are respectively fixed to the first connecting portions 6542 of the other three conductive terminals 6540. The wire L1 forms an excitation winding, the wire L2 and the wire L3 respectively form a first output winding and a second output winding. In this embodiment, the portions of each of the wires L1, L2 and L2 between the corresponding connecting portion 6542 and the resolver teeth 642 are slack.

In the present embodiment, the first connecting portions 6542 and the second connecting portion 6543 of each conductive terminal 6540 are integrally formed. Alternatively, the second connecting portion 6543 and the first connecting portion 6542 may be separately formed and then connected together. The second connecting portions 6543 extend radially for connecting with the corresponding lead wires 7. Therefore, the control device can detect the position of the rotor magnet 43 of the motor 1 via detecting the change of the induced potential of the output winding and change the power supply to the stator windings 52 of the motor 1 according to the change of the position of the rotor magnet 43. Then, the polarity of the magnetic field generated by the stator winding 52 are alternatively changed to enable the motor 1 rotate continuously.

In other embodiments, each of the conductive terminals 6540 is substantially a straight bar extending in an axial direction of the motor 1. The second connecting portion 6543 forms the upper part of the bar-shaped conductive terminal 6540 and the first connecting portion 6542 forms the lower part of the bar-shaped conductive terminal 6540. The first connecting portions 6542 and the second connecting portions 6543 are respectively connected with the winding and the lead wires 7 in similar manners as described above.

Refer to FIG. 4, the body 6541 of the connector includes a winding side portion 6544 and a lead side portion 6545. The winding side portion 6544 is formed at one end of the body 6541 close to the annular portion 653. The wires L1, L2 and L3 pass through the winding side portion 6544 to be wound on the corresponding teeth, and after winding, the wires L1, L2 and L3 pass through the winding side portion 6544 to be directed to the other three of the first connecting portions 6542. The winding side portion 6544 is formed with a plurality of grooves 6546. The grooves 6546 are filled with glue. The portions of the wires L1, L2 and L3 located between the resolver teeth and the first connecting portions 6542 are affixed to the winding side portion 6544 of the connector 654 by the glue when the wires L1, L2 and L3 pass through the winding side portion 6544. Thus, the vibration of motor will not be directly transferred to the ends of the wires L1, L2 and L3 connecting with the first connecting portions 6542 of the conductive terminal 6540, thereby reducing the risk of damaging the connections between the wires L1, L2 and L3 and the first connecting portions 6542.

The lead side portion 6545 is formed at one end of the body 6541 away from the annular portion 653. The lead side portion 6545 is formed with a plurality of guide slots 6547 extending radially. In the present embodiment, the number of the guide slots 6547 is six. In alternative embodiments, the number of the guide slots 6547 may be eight or other quantities. The guide slots 6547 are substantially elongated and parallel to each other. The guide slots 6547 are respectively configured to receive the lead wires 7. Each guide slot 6547 has an opening 6548 formed at one end thereof that is away from the annular portion 653. The lead wire 7 are accommodated in the corresponding guide slots 6547 after passing through the corresponding openings 6548. The width of each guide slot 6547 is gradually reduced in a direction toward the opening 6548 thereof. The width of each guide slot 6547 at the opening 6548 thereof is substantially equal to or less than the diameter of the corresponding lead wire 7, so that the lead wire 7 is locked into the guide slot 6547. The height of each guide slot 6547 at the opening 6548 thereof is equal to or less than the diameter of the lead wire 7 so that the portion of the lead wire 7 in the opening 6548 of the corresponding guide slot 6547 is substantially flush with or protrudes out of the guide slot 6547 (as shown in FIG. 3).

The cover 655 comprises a base plate 6551, a plurality of hooks 6552 and a pressing member 6553. The hooks 6552 protruding from the base plate 6551 are configured to secure the cover 655 to the connector 654. In this embodiment, notches 6549 are respectively defined at the bottom of the winding side portion 6544 and the lead side portion 6545. In assembly, the hooks 6552 slid over the sides of the winding side portion 6544 and lead side portion 6545 to be engaged in the notches 6549, to thereby secure the cover 655 to the connector 654. The pressing member 6553 protrudes from one face of the base plate 6551 facing the connector 654. The pressing member 6553 is configured to abut against the lead wires 7 at the opening so that the lead wires 7 are retained in the guide slot 6547. Thus when the lead wires 7 suffering external force, the external force would not be directly transferred to connections between the lead wires 7 and the second connecting portion 6543, thereby reducing the risk of damaging the connections between the lead wires 7 and the lead wire connecting portions 6543.

Figure 6:
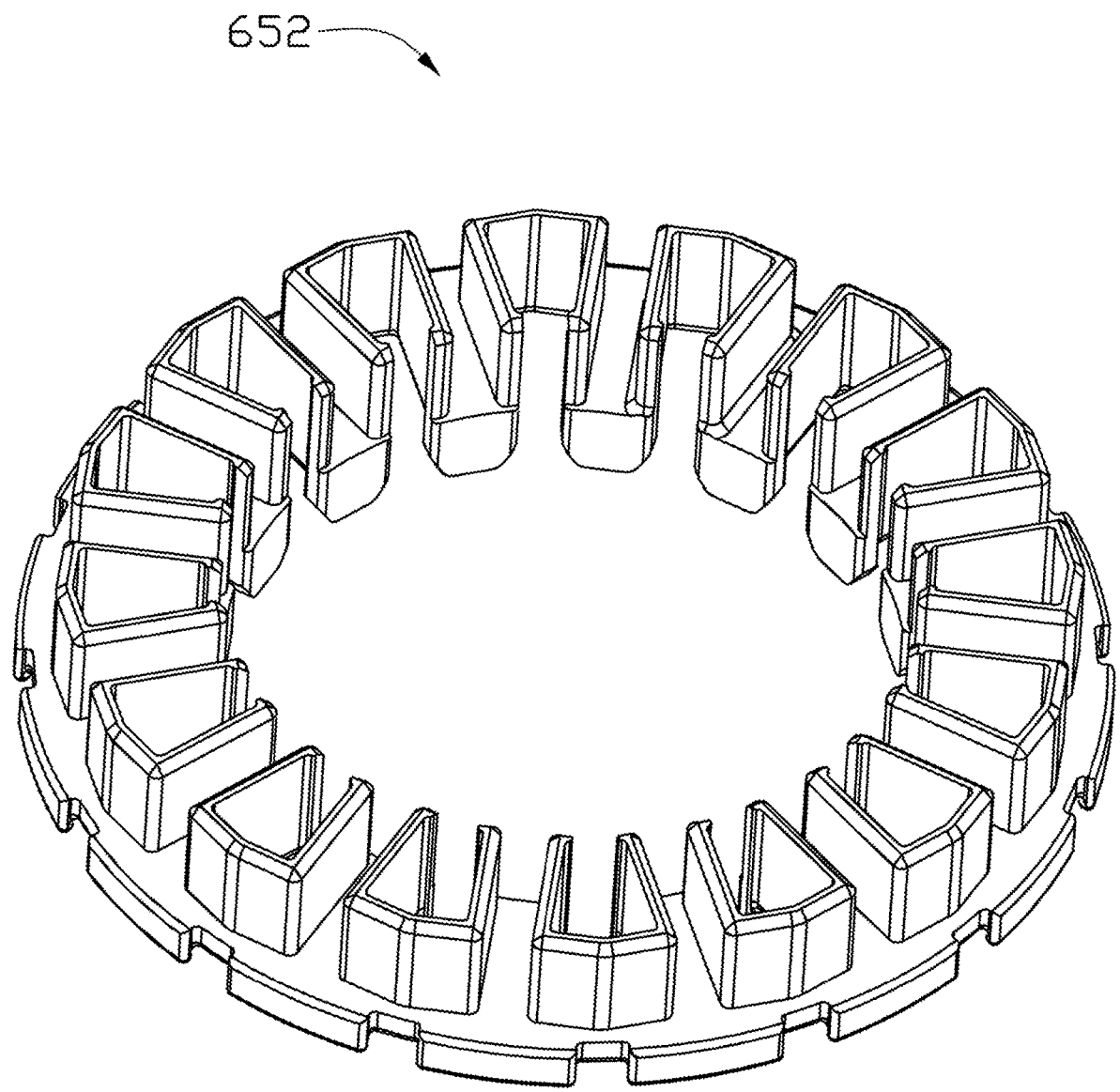
FIG. 6 is a perspective view of a lower winding bracket of the resolver of FIG. 2.

Referring to FIG. 6, the second winding bracket 652 has a similar structure with the first winding bracket 651, except that the second winding bracket 652 has no connector 654, cover 655 or wrapping post 6534 of the first winding bracket 651. The specific structure of the second winding bracket 652 is not described herein.

In the present embodiment, the limiting portion 6531 is formed with a plurality of recesses 6537 depressed inwardly from the outer peripheral surface thereof, which reduces the strength of the first and second winding brackets 651 and 652 at the recesses 6537 and thus facilitates assembling the first and second winding brackets 651 and 652 to the resolver stator core 64. In addition, the grooves 6546 formed in the surface of the winding side portions 6544 are provided with glue. When parts of the wires L1, L2 and L3 cross over the winding side portion 6544, the parts of the wires L1, L2 and L3 are affixed to the winding side portion 6544 by the glue, which reduces the possibility of damaging the connections between the wires and the first connecting portions 6542. Furthermore, the pressing member 6553 of the cover 655 abuts against the lead wires 7 to cause the lead wires 7 to be positioned in the guide slots 6547 in the axial direction. Thus, external forces acted on the lead wires 7 can not be directly transferred to the connections between the lead wires 7 and the terminals 6543, thereby reducing the risk of damaging the connections between the lead wires 7 and the terminals 6543.

Therefore, the technical solutions of embodiments of the present invention have been clearly and completely described above. Apparently, the described embodiments are merely part of, rather than all of, the embodiments of the present invention. A person skilled in the art may make various combinations of technical features in the various embodiments to meet practical needs. Based on the described embodiments of the present invention, any other embodiment obtained by a person skilled in the art without paying creative efforts shall also fall within the scope of the present invention.

The invention claimed is:

1. A resolver configured to be connected to a control device trough lead wires, comprising:
    a resolver rotor, and
    a resolver stator comprising a resolver stator core, a winding bracket mounted on the resolver stator core, and a plurality of resolver windings wound on the winding bracket, the winding bracket comprising an annular portion surrounding the resolver rotor, a connector extending outwardly from the annular portion, and a cover mounted on the connector, the connector comprising a plurality of conductive terminals connecting both the resolver winding and lead wires, and a body receiving the conductive terminals, the cover abutting against the lead wires to secure the lead wires to connector;
    wherein the annular portion is mounted to an axially end of the resolver stator core, the annular portion defines a plurality of recesses depressed inwardly from the peripheral surface thereof.

2. The resolver of claim 1, wherein the cover comprises a base plate and a pressing member projecting from a surface of the base plate facing the connector, the pressing member abut against the lead wires.

3. The resolver of claim 1, wherein the cover comprises a base plate and a plurality of hooks projecting from the base plate and engaging with the connector to secure the cover to the connector.

4. The resolver of claim 1, wherein each conductive terminal comprises a first connecting portion coupled to one of the resolver windings, and a second connecting portion coupled to one of the lead wires, the first connecting portion and the second connecting portion are rigidly connected to each other.

5. The resolver of claim 4, wherein the body of the connector comprises a winding side portion formed at one end of the connector adjacent to the annular portion, the winding side portion defines a plurality of grooves with glue received therein, ends of wind wires, which forms the resolver windings, are attached to the winding side portion by the glue.

6. The resolver of claim 1, wherein the body of the connector comprises a plurality of guide slots respectively receiving and radially guiding the lead wires.

7. The resolver of claim 6, wherein the guide slots extend radially and outwardly, each guide slot having an opening formed at an end away from the annular portion.

8. The resolver of claim 7, wherein a width of each guide slot at the opening thereof is equal to or less than a diameter of one of the lead wires.

9. The resolver of claim 7, wherein a height of each guide slot at the opening thereof is equal to or less than a diameter of the lead wire, the cover presses against the lead wires onto the body of the connector at the openings to position the lead wires in the guide slots.

10. The resolver of claim 1, wherein the resolver stator core comprises an annular yoke, the annular portion of the winding bracket comprises a limiting portion, the recesses are defined in the limiting portion, the limiting portion covers an axially end of the annular yoke with a radial width of the limiting portion being less than that of the annular yoke.

11. The resolver of claim 10, wherein the resolver stator core further comprises a plurality of resolver teeth, the annular portion of the winding bracket further comprising a plurality of tooth caps extending inwardly from the limiting portion for covering axial ends of corresponding resolver teeth, each recess is arranged between adjacent two tooth caps.

12. An electric motor comprising
a stator,
a rotor rotatably mounted to stator and includes a rotating shaft, and
a resolver configured to be connected to a control device trough lead wires; the resolver comprising:
  a resolver rotor fixedly connected with the rotating shaft, and
  a resolver stator comprising a resolver stator core, an winding bracket mounted on the resolver stator core, and a plurality of resolver windings wound on the winding bracket, the winding bracket comprising an annular portion surrounding the resolver rotor, a connector extending outwardly from the annular portion, and a cover mounted on the connector, the connector comprising a plurality of conductive terminals connecting both the resolver winding and lead wires, and a body receiving the conductive terminals, the cover abutting against the lead wires to secure the lead wires to connector;
  wherein each conductive terminal comprises a first connecting portion coupled to one of the resolver windings, and a second connecting portion coupled to one of the lead wires, the first connecting portion and the second connecting portion are rigidly connected to each other;
  wherein the body of the connector comprises a winding side portion formed at one end of the connector adjacent to the annular portion, the winding side portion defines a plurality of grooves with glue received therein, ends of wind wires, which form the resolver windings, are attached to the winding side portion by the glue.

13. The electric motor of claim 12, wherein the cover comprises a base plate and a pressing member projecting from a surface of the base plate facing the connector, the pressing member abut against the lead wires.

14. The electric motor of claim 12, wherein the cover comprises a base plate and a plurality of hooks projecting from the base plate and engaging with the connector to secure the cover to the connector.

15. The electric motor of claim 12, wherein the body of the connector comprises a plurality of guide slots respectively receiving and radially guiding the lead wires.

16. The electric motor of claim 15, wherein the guide slots extend radially and outwardly, each guide slot having an opening at an end away from the annular portion; a width and a height of each guide slot at the opening thereof are respectively equal to or less than a diameter of one of the lead wires, the cover presses against the lead wires onto the body of the connector at the openings to position the lead wires in the guide slots.

17. The electric motor of claim 12, wherein the annular portion is mounted to an axially end of the resolver stator core, the annular portion defines a plurality of recesses depressed inwardly from the peripheral surface thereof.

\* \* \* \* \*